US010568154B2

(12) United States Patent
Aminaka et al.

(10) Patent No.: US 10,568,154 B2
(45) Date of Patent: Feb. 18, 2020

(54) APPARATUS AND METHOD FOR PROXIMITY-BASED SERVICE COMMUNICATION

(71) Applicant: NEC Corporation, Tokyo (JP)

(72) Inventors: Hiroaki Aminaka, Tokyo (JP); Hiroto Sugahara, Tokyo (JP)

(73) Assignee: NEC Corporation, Tokyo (JP)

(*) Notice: Subject to any disclaimer, the term of this patent is extended or adjusted under 35 U.S.C. 154(b) by 150 days.

(21) Appl. No.: 15/556,191

(22) PCT Filed: Nov. 18, 2015

(86) PCT No.: PCT/JP2015/005751
§ 371 (c)(1),
(2) Date: Sep. 6, 2017

(87) PCT Pub. No.: WO2016/142974
PCT Pub. Date: Sep. 15, 2016

(65) Prior Publication Data
US 2018/0049259 A1 Feb. 15, 2018

(30) Foreign Application Priority Data
Mar. 6, 2015 (JP) .................................. 2015-045185

(51) Int. Cl.
*H04W 76/14* (2018.01)
*H04W 8/00* (2009.01)
(Continued)

(52) U.S. Cl.
CPC .......... *H04W 76/14* (2018.02); *H04W 8/005* (2013.01); *H04W 56/002* (2013.01);
(Continued)

(58) Field of Classification Search
None
See application file for complete search history.

(56) References Cited

U.S. PATENT DOCUMENTS

2013/0322413 A1 12/2013 Pelletier et al.
2014/0112194 A1* 4/2014 Novlan ................. H04W 8/005
370/254
(Continued)

FOREIGN PATENT DOCUMENTS

WO WO 2014/050686 4/2014
WO WO 2014/069221 5/2014
(Continued)

OTHER PUBLICATIONS

International Search Report dated Jan. 26, 2016, in corresponding PCT International Application.
(Continued)

*Primary Examiner* — Hassan A Phillips
*Assistant Examiner* — Gautam Sharma
(74) *Attorney, Agent, or Firm* — Finnegan, Henderson, Farabow, Garrett & Dunner, L.L.P.

(57) ABSTRACT

A radio terminal (1) receives a request and a radio configuration from a network (100) when the radio terminal (1) can connect to the network (100). The request requests transmission of the radio configuration. The radio configuration includes a radio parameter for sidelink communication (102) with a second radio terminal (2) which is in a state of being unable to connect to the network (100). The sidelink communication includes at least one of direct discovery and direct communication. The radio terminal (1) is further configured to transmit the radio configuration in response to this request, and to perform the sidelink communication in accordance with the radio configuration with the second radio terminal (2) that has received the radio configuration. It is thus, for example, possible to contribute to improvement of the sidelink communication in the partial coverage.

6 Claims, 11 Drawing Sheets

(51) Int. Cl.
  *H04W 56/00* (2009.01)
  *H04W 72/04* (2009.01)
  *H04W 4/70* (2018.01)
  *H04W 76/27* (2018.01)
  *H04W 72/14* (2009.01)

(52) U.S. Cl.
  CPC ..... *H04W 72/0406* (2013.01); *H04W 72/048* (2013.01); *H04W 4/70* (2018.02); *H04W 72/14* (2013.01); *H04W 76/27* (2018.02)

(56) References Cited

U.S. PATENT DOCUMENTS

| | | | | |
|---|---|---|---|---|
| 2015/0215903 | A1* | 7/2015 | Zhao | H04W 72/04 370/329 |
| 2015/0271720 | A1* | 9/2015 | Yamada | H04W 76/14 370/331 |
| 2015/0271841 | A1* | 9/2015 | Yamada | H04W 56/0045 370/329 |
| 2015/0271846 | A1* | 9/2015 | Kowalski | H04W 72/14 370/329 |
| 2015/0327046 | A1* | 11/2015 | Lee | H04W 56/002 370/338 |
| 2015/0327201 | A1* | 11/2015 | He | H04W 48/16 370/336 |
| 2015/0382324 | A1* | 12/2015 | Sheng | H04W 72/02 370/329 |
| 2016/0073408 | A1* | 3/2016 | Sartori | H04W 72/0453 370/329 |
| 2016/0095144 | A1* | 3/2016 | Lindoff | H04W 24/08 370/329 |
| 2016/0150390 | A1* | 5/2016 | Chen | H04W 8/005 370/311 |

FOREIGN PATENT DOCUMENTS

| | | |
|---|---|---|
| WO | WO 2015/002234 | 1/2015 |
| WO | WO 2015/019940 | 2/2015 |

OTHER PUBLICATIONS

3GPP TS 23.303 V12.3.0 (Dec. 2014), $3^{rd}$ Generation Partnership Project; Technical Specification Group Services and System Aspects; Proximity-based services (ProSe); Stage 2 (Release 12), pp. 1-62, (2014).

3GPP TS 36.300 V12.4.0 (Dec. 2014), $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), pp. 1-251, (2014).

3GPP TSG-RAN WG1 Meeting #78bis, R1-144165, "Basic Synchronization Procedure for D2D Operation", pp. 1-5, (2014).

3GPP TSG-RAN WG1 #79, R1-145063, "Detailed Synchronization Procedure", pp. 1-10, (2014).

3GPP TSG-RAN WG1 #74bis, R1-134308, "Resource Allocation of D2D Communication", pp. 1-6, (2013).

* cited by examiner

APPARATUS AND METHOD FOR PROXIMITY-BASED SERVICE COMMUNICATION

CROSS-REFERENCE TO RELATED PATENT APPLICATIONS

This application is a National Stage Entry of International Application No. PCT/JP2015/005751, filed Nov. 18, 2015, which claims priority from Japanese Patent Application No. 2015-045185, filed Mar. 6, 2015. The entire contents of the above-referenced applications are expressly incorporated herein by reference.

TECHNICAL FIELD

The present application relates to Proximity-based services (ProSe) and, in particular, to direct discovery and direct communication that are performed by using a direct interface between radio terminals.

TECHNICAL FIELD

The 3GPP Release 12 specifies Proximity-based services (ProSe) (see, for example, Non-patent Literature 1). ProSe includes ProSe discovery and ProSe direct communication. ProSe discovery makes it possible to detect proximity of radio terminals. ProSe discovery includes direct discovery (ProSe Direct Discovery) and network-level discovery (EPC-level ProSe Discovery).

ProSe Direct Discovery is performed through a procedure in which a radio terminal capable of performing ProSe (i.e., ProSe-enabled UE) detects another ProSe-enabled UE by using only the capability of a radio communication technology (e.g., Evolved Universal Terrestrial Radio Access (E-UTRA) technology) possessed by these UEs. On the other hand, in EPC-level ProSe Discovery, a core network (i.e., Evolved Packet Core (EPC)) determines proximity of two ProSe-enabled UEs and notifies these UEs of detection of proximity. ProSe Direct Discovery may be performed by three or more ProSe-enabled UEs.

ProSe direct communication enables establishment of a communication path between two or more ProSe-enabled UEs existing in a direct communication range after the ProSe discovery procedure is performed. In other words, ProSe direct communication enables a ProSe-enabled UE to directly communicate with another ProSe-enabled UE, without communicating through a Public Land Mobile Network (PLMN) including a base station (eNodeB). ProSe direct communication may be performed by using a radio communication technology that is also used to access a base station (eNodeB) (i.e., E-UTRA technology) or by using a wireless local area network (WLAN) radio technology (i.e., IEEE 802.11 radio technology).

In 3GPP Release 12, a ProSe function communicates with a ProSe-enabled UE through a Public Land Mobile Network (PLMN) and assists ProSe discovery and ProSe direct communication. The ProSe function is a logical function that is used for PLMN-related operations required for ProSe. The functionality provided by the ProSe function includes, for example: (a) communication with third-party applications (a ProSe Application Server); (b) authentication of a UE for ProSe discovery and ProSe direct communication; (c) transmission of configuration information for ProSe discovery and ProSe direct communication (e.g., EPC-ProSe-User ID) to a UE; and (d) provision of network-level discovery (i.e., EPC-level ProSe discovery). The ProSe function may be implemented in one or more network nodes or entities, in this specification, one or more network nodes or entities that implement the ProSe function are referred to as a "ProSe function entity" or a "ProSe function server".

As described above, ProSe direct discovery and ProSe direct communication are performed on an inter-UE direct interface. This direct interface is referred to as a PC5 interface or a sidelink. Hereinafter, in this specification, communication including at least one of direct discovery and direct communication is referred to as "sidelink communication".

A UE needs to communicate with a ProSe function before performing sidelink communication (see Non-patent Literature 1). In order to perform ProSe direct communication and ProSe direct discovery, the UE has to communicate with the ProSe function and acquire authentication information by the PLMN from the ProSe function in advance. Further, in the case of ProSe direct discovery, the UE has to transmit a discovery request to the ProSe function. Specifically, when the UE desires transmission (announcement) of discovery information on the sidelink, the UE transmits to the ProSe function a discovery request, for the announcement. On the other hand, when the UE desires reception (monitoring) of discovery information on the sidelink, the UE transmits to the ProSe function a discovery request for the monitoring. Then, when the discovery request has succeeded, the UE is permitted to transmit or receive the discovery information on the inter-UE direct interface (e.g., sidelink or PC5 interface).

The allocation of radio resources for the sidelink communication to n UE is performed by a radio access network (e.g., Evolved Universal Terrestrial Radio Access Network (E-UTRAN)) (see Non-patent Literatures 1 and 2). The UE which is permitted to perform the sidelink communication by the ProSe function performs ProSe direct discovery or ProSe direct communication by using radio resources configured by a radio access network node (e.g., eNodeB). Sections 23.10 and 23.11 of Non-patent Literature 2 describe details of the allocation of radio resources for the sidelink communication to a UE.

Regarding ProSe direct communication, two resource allocation modes, i.e., Scheduled resource allocation and Autonomous resource selection are specified. In the Scheduled resource allocation for ProSe direct communication, a UE requests an eNodeB to allocate resources and the eNodeB schedules resources for sidelink control and data for the UE. Specifically, the UE sends to the eNodeB a scheduling request together with a ProSe Buffer Status Report (BSR).

On the other hand, in the Autonomous resource selection of ProSe direct communication, a UE autonomously selects resources for sidelink control and data from a resource pool(s). An eNodeB may allocate a resource pool(s) for the Autonomous resource selection to a UE in a System Information Block (SIB) 18. The eNodeB may allocate a resource pool for the Autonomous resource selection to a UE in Radio Resource Control (RRC)_CONNECTED via dedicated RRC signaling. This resource pool may be available when the UE is in RRC_IDLE.

Regarding ProSe direct discovery, two resource allocation modes, i.e., Scheduled resource allocation and Autonomous resource selection are also specified. In the Autonomous resource selection for ProSe direct discovery, a UE that desires transmission (announcement) of discovery information autonomously selects radio resources from a resource pool(s) for announcement. This resource pool is configured in UEs via broadcast (SIB 19) or dedicated signaling (RRC signaling).

In the Scheduled resource allocation for ProSe direct discovery, a UE requests an eNodeB to allocate resources for announcement via RRC signaling. The eNodeB allocates resources for announcement from a resource pool that is configured in UEs for monitoring. When the Scheduled resource allocation is used, the eNodeB indicates in SIB19 that it provides resources for monitoring of ProSe direct discovery but does not provide resources for announcement.

Furthermore, 3GPP Release 12 specifies a partial coverage scenario in which one UE is located out of the network coverage and the other UE is located in the network coverage (e.g., see Sections 4.4.3, 4.5.4 and 5.4.4 of Non-Patent Literature 1). In the partial coverage scenario, a UE that is out of coverage is referred to as a "remote UE" and a UE that is in coverage and acts as a relay between the remote UE and the network is referred to as a "ProSe UE-to-Network Relay". The ProSe UE-to-Network Relay relays traffic (downlink and uplink) between the remote UE and the network (i.e., E-UTRAN and EPC).

More specifically, the ProSe UE-to-Network Relay attaches to the network as a UE, establishes a PDN connection to communicate with a ProSe function entity or another Packet Data Network (PDN), and communicates with the ProSe function entity to start ProSe Direct Communication. The ProSe UE-to-Network Relay further performs the discovery procedure with the remote UE, communicates with the remote UE on the inter-UE direct interface (e.g., sidelink or PC5 interface), and relays traffic (downlink and uplink) between the remote UE and the network. When the Internet Protocol version 4 (IPv4) is used, the ProSe UE-to-Network Relay serves as a Dynamic Host Configuration Protocol Version 4 (DHCPv4) Server and Network Address Translation (NAT). When the IPv6 is used, the ProSe UE-to-Network Relay serves as a stateless DHCPv6 Relay Agent. In this specification, a radio terminal that has the ProSe function and the relay function such as the ProSe UE-to-Network Relay is herein referred to as a "relay radio terminal" or a "relay UE". Further, a radio terminal that is served with the relay service by the relay radio terminal (relay UE) is hereinafter referred to as a "remote radio terminal" or a "remote UE".

Note that 3GPP Release 12 ProSe is one example of proximity-based services (ProSe) that are provided based on geographic proximity of a plurality of radio terminals. Similarly to 3GPP Release 12 ProSe, the proximity-based service in a public land mobile network (PLMN) includes discovery and direct-communication phases assisted by a function or a node (e.g., ProSe function) located in the network. In the discovery phase, geographic proximity of radio terminals is determined or detected. In the direct communication phase, the radio terminals perform direct communication. The direct communication is performed between radio terminals in proximity to each other, without communicating through a public land mobile network (PLMN). The direct communication is also referred to as "device-to-device (D2D) communication" or "peer-to-peer communication". In this specification, the term. "ProSe" is not limited to 3GPP Release 12 ProSe and refers to proximity-based service communication including at least one of discovery and direct communication. Further, each of the terms "proximity-based service communication" and "ProSe communication" in this specification refers to at least one of the discovery and the direct communication.

The term "public land mobile network (PLMN)" in this specification indicates a wide-area radio infrastructure network, and means a multiple-access mobile communication system. The multiple-access mobile communication system enables mobile terminals to perform radio communication substantially simultaneously by sharing radio resources including at least one of time resources, frequency resources, and transmission power resources among the mobile terminals. Typical examples of multiple-access technology include Time Division Multiple Access (TDMA), Frequency Division Multiple Access (FDMA), Code Division Multiple Access (CDMA), Orthogonal Frequency Division Multiple Access (OFDMA), and any combination thereof. The public land mobile network includes a radio access network and a core network. Examples of the public land mobile network include a 3GPP Universal Mobile Telecommunications System (UMTS), a 3GPP Evolved Packet System (EPS), a 3GPP2 CDMA2000 system, a Global System for Mobile communications (GSM (Registered Trademark))/General packet radio service (GPRS) system, a WiMAX system, and a mobile WiMAX system. The EPS includes a Long Term Evolution (LTE) system and an LTE-Advanced system.

CITATION LIST

Patent Literature

[Patent Literature 1] International Patent Publication No. WO 2014/050886

Non-Patent Literature

[Non-Patent Literature 1] 3GPP TS 23.303 V12.3.0 (2014-12), "3rd Generation Partnership Project; Technical Specification Group Services and System Aspects; Proximity-based services (ProSe); Stage 2 (Release 12)", December, 2014

[Non-Patent Literature 2] 3GPP TS 36,300 V12.4.0 (2014-12), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", December, 2014

SUMMARY OF INVENTION

Technical Problem

3GPP Release 12 does not specifically describe a procedure for starting sidelink communication in the partial coverage (i.e., sidelink communication between the relay UE and the remote UE). Further, 3GPP Release 12 does not provide details about determination of radio parameters (e.g., radio resources) to be used in the sidelink communication in the partial coverage.

Meanwhile, Patent Literature 1 describes the sidelink communication in the partial coverage. Specifically, in one example, a UE (i.e., remote UE candidate) requests a network to prepare direct discovery when the reception quality from the base station decreases. In response to this request from the UE, the network determines a relay UE and requests the determined relay UE to start the direct discovery operation. In accordance with the request from the network, the relay UE starts announcement (transmission) of a discovery signal for direct discovery or monitoring (reception) of a discovery signal transmitted from the remote UE.

Patent Literature 1 further describes that radio resources to be used for direct discovery and direct communication between the relay UE and the remote UE may be selected either by one of the UEs or by the base station. However, Patent Literature 1 does not describe how to notify the remote UE of the radio resources selected by the base station.

One of the objects to be attained by embodiments disclosed herein is to provide an apparatus, a method, and a program that contribute to improvement of the sidelink communication in the partial coverage.

Solution to Problem

In a first aspect, a radio terminal apparatus includes at least one radio transceiver and at least one processor coupled to the at least one radio transceiver. The at least one processor is configured to receive a request and a radio configuration from the network via the at least one radio transceiver when the radio terminal apparatus can connect to the network. The request requests transmission of the radio configuration. The radio configuration includes a radio parameter for sidelink communication with a second radio terminal which is in a state of being unable to connect to the network The sidelink communication includes at least one of direct discovery and direct communication. The at least one processor is further configured to transmit the radio configuration via the at least one radio transceiver and is configured to perform the sidelink communication in accordance with the radio configuration, via the at least one radio transceiver, with the second radio terminal that has received the radio configuration.

In a second aspect, a radio terminal apparatus includes at least one radio transceiver and at least one processor coupled to the at least one radio transceiver. The at least one processor is configured to receive, when the radio terminal apparatus cannot connect to a network, a radio configuration transmitted from a first radio terminal which is in a state of being able to connect to the network. The radio configuration includes a radio parameter for the radio terminal apparatus which is in a state of being unable to connect to the network to perform sidelink communication with the first radio terminal which is in the state of being able to connect to the network. The sidelink communication includes at least one of direct discovery and direct communication. The at least one processor is further configured to perform the sidelink communication in accordance with the radio configuration with the first radio terminal via the at least one radio transceiver.

In a third aspect, a network apparatus includes a memory and at least one processor coupled to the memory. The at least one processor is configured to transmit a request and a radio configuration to a first radio terminal which is in a state of being able to connect to the network. The request requests the first radio terminal to transmit the radio configuration. The radio configuration includes a radio parameter for sidelink communication with a second radio terminal which is in a state of being unable to connect to the network. The sidelink communication includes at least one of direct discovery and direct communication.

In a fourth aspect, a method performed by a first radio terminal includes:

(a) receiving a request and a radio configuration from the network when the first radio terminal can connect to the network, the request requesting transmission of the radio configuration, the radio configuration, the radio configuration including a radio parameter for sidelink communication with a second radio terminal which is in a state of being unable to connect to the network, the sidelink communication including at least one of direct discovery and direct communication; and (b) transmitting the radio configuration.

In a fifth aspect, a method performed by a second radio terminal includes:

(a) receiving, when the second radio terminal cannot connect to a network, a radio configuration transmitted from a first radio terminal which is in a state of being able to connect to the network, the radio configuration including a radio parameter for the second radio terminal which is in a state of being unable to connect to the network to perform sidelink communication with the first radio terminal which is in the state of being able to connect to the network, the sidelink communication including at least one of direct discovery and direct communication; and (b) performing the sidelink communication in accordance with the radio configuration with the first radio terminal.

In a sixth aspect, a method performed by a network apparatus located in a network includes transmitting a request and a radio configuration to a first radio terminal which is in a state of being able to connect to the network. The request requests the first radio terminal to transmit the radio configuration. The radio configuration includes a radio parameter for sidelink communication with a second radio terminal which is in a state of being unable to connect to the network. The sidelink communication includes at least one of direct discovery and direct communication.

In a seventh aspect, a program includes instructions (software codes) that, when loaded into a computer, cause the computer to perform the method according to the aforementioned fourth, fifth, or sixth aspect.

Advantageous Effects of Invention

According to the aforementioned aspects, it is possible to provide an apparatus, a method, and a program that contribute to improvement of the sidelink communication in the partial coverage.

DESCRIPTION OF EMBODIMENTS

Figure 1:
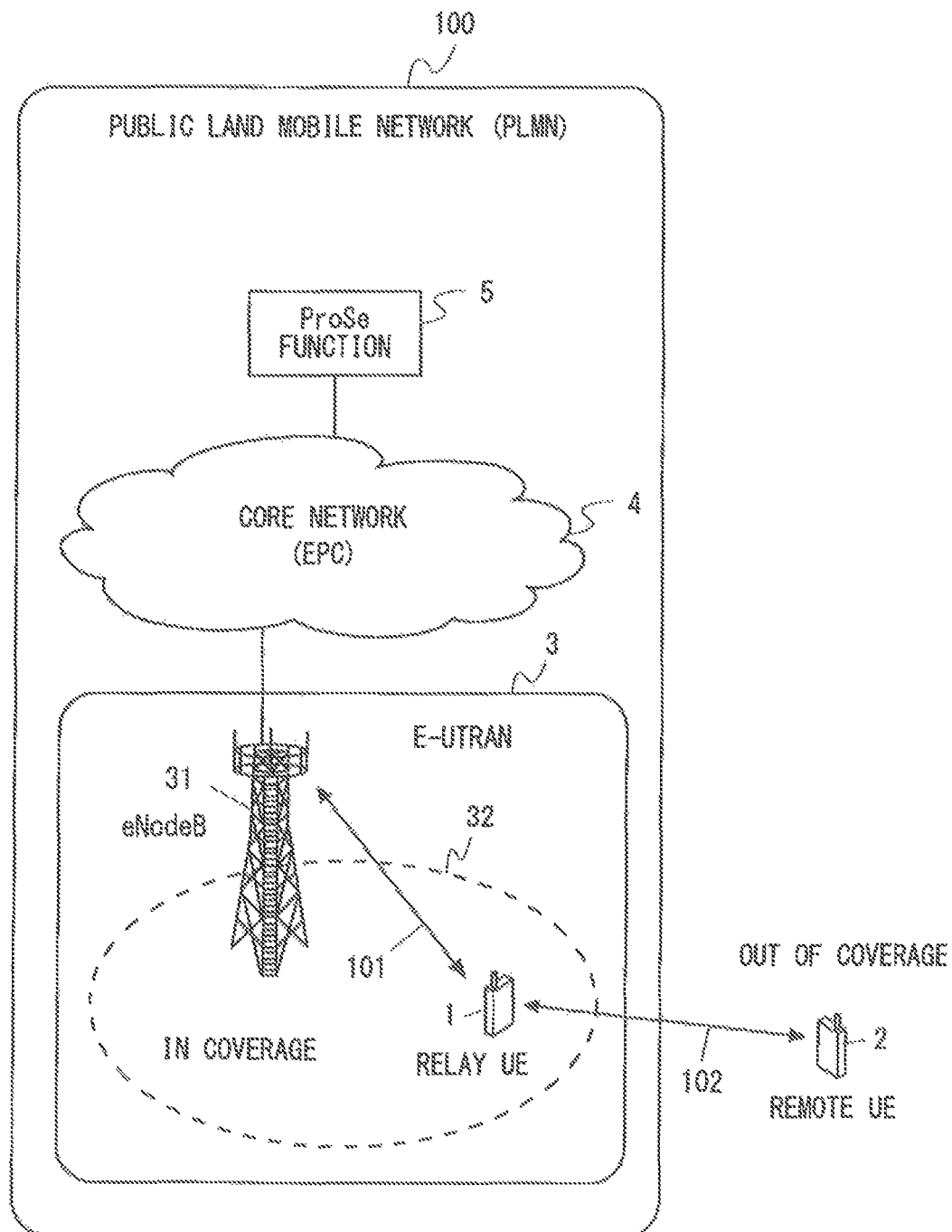
FIG. 1 is a diagram showing a configuration example of a public land mobile network according to several embodiments.

Specific embodiments are explained hereinafter in detail with reference to the drawings. In the drawings, the same or corresponding elements are denoted by the same reference signs, and repetitive descriptions will be avoided as necessary for clarity of explanation.

Embodiments described below will be explained mainly using specific examples with regard to an Evolved Packet System (EPS). However, these embodiments are not limited to being applied to the EPS and may also be applied to other mobile communication networks or systems such as a 3GPP (UMTS), a 3GPP2 CDMA2000 system, a GSM/GPRS system, and a WiMAX system.

First Embodiment

FIG. 1 shows a configuration example of a network according to this embodiment. Both a relay UE 1 and a remote UE 2 are radio terminals capable of performing ProSe (i.e., ProSe-enabled UEs) and are able to perform sidelink communication on an inter-terminal direct interface (i.e., PC5 interface or sidelink) 102. The sidelink communication includes at least one of ProSe Direct Discovery and ProSe Direct Communication. The sidelink communication is performed by using a radio communication technology (E-UTRA technology) that is also used to access a base station (eNodeB) 31.

The relay UE 1 relays traffic (downlink and uplink) between the remote UE 2 and a PLMN 100 (i.e., E-UTRAN 3 and EPC 4). In some implementations, the relay UE 1 attaches to the EPC 4, establishes a PDN connection to communicate with a ProSe function entity 5, and communicates with the ProSe function entity 5 to start sidelink communication. The relay UE 1 may use, for example, network-level discovery (i.e., EPC-level ProSe Discovery) provided by the ProSe function entity 5 or may receive, from the ProSe function entity 5, a message indicating permission for the relay UE 1 to activate direct discovery or direct communication. The relay UE 1 may further establish another PDN connection to communicate with a Packet Data Network (PDN) other than the ProSe function entity 5 and communicate with a node(s) in this PDN.

The remote UE 2 communicates with the ProSe function entity 5 or another PDN node via the direct interface (i.e., PC5 interface or sidelink) 102 with the relay UE 1. In the example shown in FIG. 1, the remote UE 2 is located out of a cell 32 of the eNodeB 31 (i.e., out of coverage). However, the remote UE 2 may be located within the cell 32 and be in a state of being unable to connect to the PLMN 100 due to any condition (e.g., selection by the user). The remote UE 2 performs the sidelink communication with the relay UE 1 in a state of being unable to connect to the PLMN 100 (e.g., out of coverage).

For convenience of explanation, in this specification, the sidelink communication between the relay UE 1 and the remote UE 2 is referred to as the "sidelink communication in the partial coverage". However, the "sidelink communication in the partial coverage" herein includes sidelink communication between the relay UE 1 that is in coverage and the remote UE 2 performed when the remote UE 2 is unable to connect to the PLMN 100 due to various factors.

In this specification, the "sidelink communication in the partial coverage" may also be referred to as "ProSe UE-to-Network Relaying".

It may be determined that the remote UE 2 cannot connect to the PLMN 100 when the reception quality (e.g., Reference Signal Received Power (RSRP) or Reference Signal Received Quality (RSRQ)) of a radio signal transmitted from one of the eNodeBs 31 in the PLMN 100 is equal to or smaller than a predetermined threshold value. In other words, the remote UE 2 may determine that it cannot connect to the PLMN 100 in response to detecting that it has not successfully received the radio signal from the PLMN 100. Alternatively, the remote UE 2 may determine that it cannot connect to the PLMN 100 based on detecting that a connection to the PLMN 100 (e.g., attach to the EPC 4) has been rejected although it can receive radio signals from the eNodeB 31. Alternatively, the remote UE 2 may determine that it cannot connect to the PLMN 100 based on detecting that the remote UE 2 cannot normally communicate with the ProSe function entity 5 while it has been allowed to connect to the PLMN 100. Alternatively, the remote UE 2 may determine that it cannot connect to the PLMN 100 based on detecting that it has forcibly disconnected or deactivated its connection to the PLMN 100 according to an instruction from the user or from a control node in the PLMN 100 (e.g., ProSe function entity 5 or Operation Administration and Maintenance (OAM) server).

The eNodeB 31 is an entity located in the radio access network (i.e., E-UTRAN) 3, manages the cell 32 and is able to perform communication (101) with the relay UE 1 (101) by using the E-UTRA technology.

The core network (i.e., EPC) 4 includes a plurality of user-plane entities (e.g., Serving Gateway (S-GW) and Packet Data Network Gateway (P-GW)) and a plurality of control-plane entities (e.g., Mobility Management Entity (MME) and Home Subscriber Server (HSS)). The user-plane entities relay user data of the relay UE 1 and the remote UE 2 between the E-UTRAN 3 and an external network (PDN). The control-plane entities perform various kinds of control for the relay UE 1 including mobility management, session management (bearer management), subscriber information management, and billing management.

Figure 2:
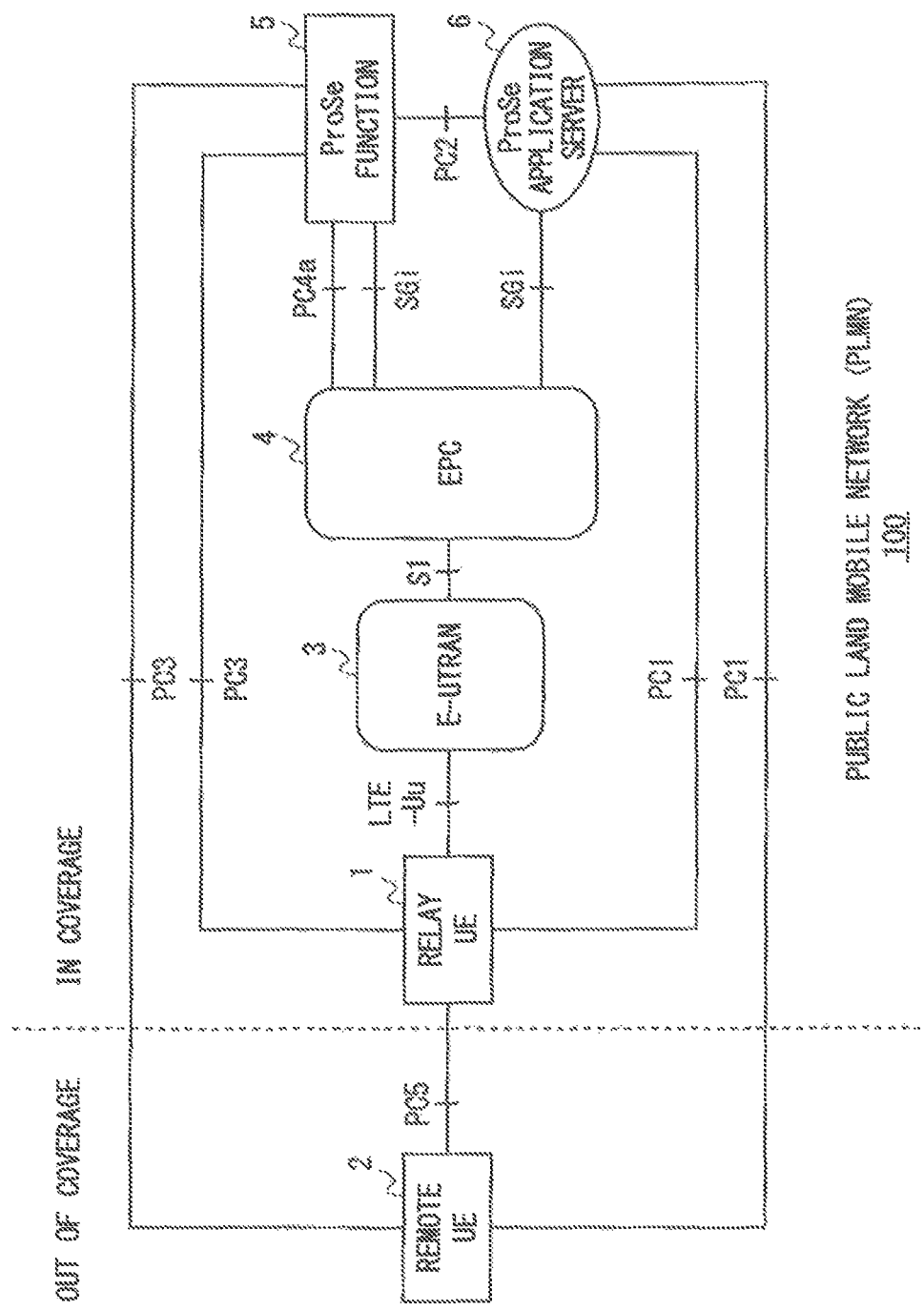
FIG. 2 is a diagram showing a configuration example of the public land mobile network according to several embodiments.

FIG. 2 shows reference points used in the sidelink communication in the partial coverage (ProSe UE-to-Network Relaying). Each reference point may be referred to as an "interface". FIG. 2 shows a non-roaming architecture in which the relay UE 1 and the remote UE 2 use a subscription of the same FLMN 100. However, the Home PLMN (HPLMN) of the remote UE 2 may differ from the HPLMN of the relay UE 1. As one of the main applications of the sidelink communication in the partial coverage (ProSe UE-to-Network Relaying), a public safety usage is assumed. In the public safety usage, for example, the relay UE 1 in the PLMN 100 may perform sidelink communication with the remote UE 2 that does not have a subscription with the PLMN 100.

A PC1 reference point is a reference point between a ProSe application server 6 and a ProSe application in each of the relay UE 1 and the remote UE 2 and. The PC1 reference point is used to define application-level signalling requirements. The PC1 reference point depends on the user plane of the EPC 4 and, accordingly, communication between the ProSe application of the UE 1 and the ProSe application server 6 is transferred on the user plane of the EPC 4. Therefore, the ProSe application server 6 communicates with the EPC 4 (i.e., P-GW) through an SGi reference point.

A PC2 reference point is a reference point between the ProSe application server 6 and the ProSe function entity 5. The PC2 reference point is used to define interactions between the ProSe application server 6 and the ProSe functionality provided by the 3GPP EPS through the ProSe function entity 5.

A PC3 reference point is a reference point between each of the relay UE 1 and the remote UE 2 and the ProSe function entity 5. The PC3 reference point is used to define interactions between each UE relay UE 1 and remote UE 2) and the ProSe function entity 5 (e.g., UE registration, application registration, and authorization for ProSe Direct Discovery and EPC-level ProSe Discovery requests). The PC3 reference point depends on the user plane of the EPC 4 and, accordingly, ProSe control signalling between the UE 1 and the ProSe function entity 5 is transferred on the user plane of the EPC 4. Therefore, the ProSe function entity 5 communicates with the EPC 4 (i.e., P-GW) through an SGi reference point.

A PC4a reference point is a reference point between the ProSe function entity 5 and an HSS in the EPC 4. This reference point is used by the ProSe function entity 5, for example, to acquire subscriber information related to ProSe services.

As already described above, the PC5 reference point is a reference point between ProSe-enabled UEs and is used for the control plane and user plane of ProSe Direct Discovery, ProSe Direct Communication, and ProSe UE-to-Network Relay. The relay UE 1 and the remote UE 2 according to this embodiment perform sidelink communication including at least one of direct discovery and direct communication on the PC5 reference point.

Figure 3:
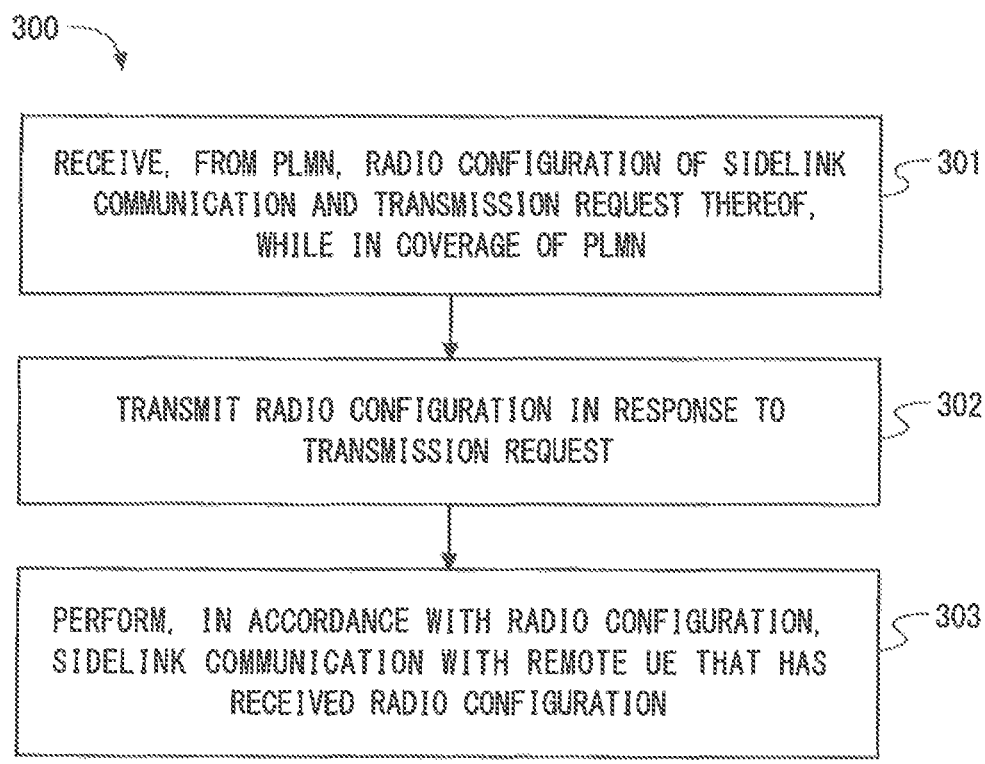
FIG. 3 is a flowchart showing one example of operations of a relay UE according to a first embodiment.

In the following description, the sidelink communication procedure in the partial coverage according to this embodiment will be described. FIG. 3 is a flowchart showing one example (Process 300) of operations of the relay UE 1 regarding the sidelink communication in the partial coverage. In Block 301, when the relay UE 1 is in a state of being able to connect to the PLMN 100 (e.g., in coverage of the PLMN 100), the relay UE 1 receives, from the PLMN 100, radio configuration of sidelink communication and a request for transmission of the radio configuration. The state of being able to connect to the PLMN 100 includes, at least, a state in which the relay UE 1 is in coverage of the PLMN 100 (e.g., in the cell 32). In other words, the state in which the relay UE 1 is in coverage of the PLMN 100 (e.g., in the cell 32) may be a necessary condition or may be a necessary and sufficient condition for the relay UE 1 to be in the state of being able to connect to the PLMN 100. The state of being able to connect to the PLMN 100 may include, besides a state in which the relay UE 1 is in coverage (e.g., in the cell 32), a state in which the user does not restrict the relay UE 1 to connect to the PLMN 100. In the following description, it is assumed that the state of being able to connect to the PLMN 100 means that the relay UE 1 is in coverage of the PLMN 100.

As will be described later, this transmission request may be transmitted from one of the eNodeB 31, an MME in the EPC 4, the ProSe function entity 5, and an Operation Administration and Maintenance (GAM) server coupled to the PLMN 100. In some Implementations, this transmission request may be transmitted when the network (e.g., eNodeB 31, MME, or ProSe function entity 5) detects that the remote UE 2 is, or is about to be, out of coverage. Further or alternatively, this transmission request may be transmitted in response to reception by the PLMN 100 of a notification from the remote UE 2 (e.g., indicating that it is about to be out of coverage). Further or alternatively, this transmission request may be transmitted when the control apparatus in the network (e.g., eNodeB 31, MME, ProSe function entity 5, or OAM server) detects that the network facility has gone down or is likely to go down.

This transmission request may be an activation request for the sidelink communication. In other words, this transmission request may represent activation of the sidelink communication. In response to the reception of the activation request for the sidelink communication, the relay UE 1 may transmit the radio configuration prior to the start of the sidelink communication.

The radio configuration includes a radio configuration for sidelink communication (i.e., the sidelink communication in the partial coverage) with the remote UE 2, which is in the state of being unable to connect to the PLMN 100. The radio configuration specifies radio resources to be used for direct communication (e.g., frequency resources, time resources, resource blocks, transmission power, or any combination thereof). The radio configuration may be transmitted to the relay UE 1 from the same node as the transmission request or may be transmitted to the relay UE 1 from a different node than the transmission request.

In one implementation, the radio configuration in Block 301 may specify at least one of: a frequency band identifier; a center frequency (E-UTRA Absolute Radio Frequency Channel Number (EARFCN)); maximum transmission power (P-MAX-ProSe); a Time Division Duplex (TDD) uplink-downlink configuration; the number of resource blocks (Physical Resource Blocks (PRBs)); an offset of Start PRB; and an offset of End PRB.

In one implementation, the radio configuration in Block 301 may include a resource pool(s) for the Autonomous resource selection of direct discovery that is transmitted via System Information Block (SIB) 19 from the eNodeB 31. In this case, the relay UE 1 may autonomously select, from the resource pool(s) specified by SIB 19, resources to be used for announcement (transmission) or monitoring (reception) of a discovery message (a discovery signal) in direct discovery.

Alternatively, the Scheduled resource allocation may be used for radio configuration of direct discovery. For example, in response to the reception of the transmission request sent from the ProSe function entity 5, the relay UE 1 may request the eNodeB 31 to allocate resources for announcement via RRC signalling. The eNodeB 31 may notify the relay UE 1 of the radio resources for announcement via RRC signalling in response to the request sent from the relay UE 1. That is, the radio configuration in Block 301 may include dedicated radio resource allocation by the eNodeB 31 for the announcement of direct discovery.

In one implementation, the radio configuration in Block 301 may specify a resource pool(s) for the Autonomous resource selection of direct communication that is transmitted via System Information Block (SIB) 18 from the eNodeB 31. In this case, the relay UE 1 may autonomously select resources to be used for sidelink control and data from the resource pool(s) specified by SIB 18.

Alternatively, the relay UE 1 may request the eNodeB 31 for the radio configuration prior to the reception of this radio configuration for direct communication. For example, in response to the reception of the transmission request from the ProSe function entity 5, the relay UE 1 may transmit to the eNodeB 31 a ProSe Direct indication indicating that it has an interest in ProSe Direct Communication. In response to the ProSe Direct indication, the eNodeB 31 may allocate to the relay UE 1, via dedicated RRC signalling, a resource pool(s) for the Autonomous resource selection of ProSe Direct Communication.

Alternatively, the Scheduled resource allocation may be used for ProSe Direct Communication in the partial coverage. In this case, the relay UE 1 may transmit to the eNodeB 31 a scheduling request together with a ProSe Buffer Stains Report (BSR). In response to this scheduling request, the eNodeB 31 may schedule resources (i.e., the radio configuration) for sidelink control and data to the relay UE 1 in accordance with the Scheduled resource allocation of ProSe direct communication. That is, the radio configuration in Block 301 may include dedicated allocation by the eNodeB 31 of radio resource for direct communication.

In Block 302, in response to the transmission request in Block 301, the relay UE 1 transmits the radio configuration received in Block 301. In Block 303, the relay UE 1 performs, in accordance with this radio configuration, sidelink communication with the remote UE 2 that has received this radio configuration. In some implementations, in order to perform direct discovery to search for the remote UE 2 which is in a state of being unable to connect to the PLMN 100, the relay UE 1 may perform announcement (transmission) or monitoring (reception) of a discovery message (a discovery signal) in accordance with the radio configuration received in Block 301. In some implementations, the relay UE 1 may transmit or receive signals for direct communication (e.g., Physical sidelink broadcast channel (PSBCH), Physical sidelink control channel (PSCCM), and Physical Sidelink Shared Channel (PSSCH)) to or from the remote UE 2 in accordance with the radio configuration received in Block 301.

In some implementations, when the relay UE 1 has received the transmission request, the relay UE 1 may transmit, besides the radio configuration, a synchronization signal to be detected by the remote UE 2 (e.g., Sidelink Synchronization Signal).

Alternatively, the relay UE 1 may transmit the radio configuration when it is already transmitting the synchronization signal (or when the condition for transmitting the synchronization signal is satisfied). When the condition for transmitting the synchronization signal is not satisfied, the relay UE 1 may reject (or ignore) the transmission request requesting transmission of the radio configuration. The relay UE 1 may be configured to transmit the synchronization signal to be detected by the remote UE 2, autonomously or in response to an instruction from the PLMN 100 (e.g., eNodeB 31) when the relay UE 1 is located near a cell edge of the cell 32 (i.e., coverage boundary of the PLMN 100). For example, the relay UE 1 may autonomously transmit the synchronization signal when the reception quality (e.g., RSRP or RSRQ) of a radio signal transmitted from the eNodeB 31 is equal to or smaller than a threshold value.

Figure 4:
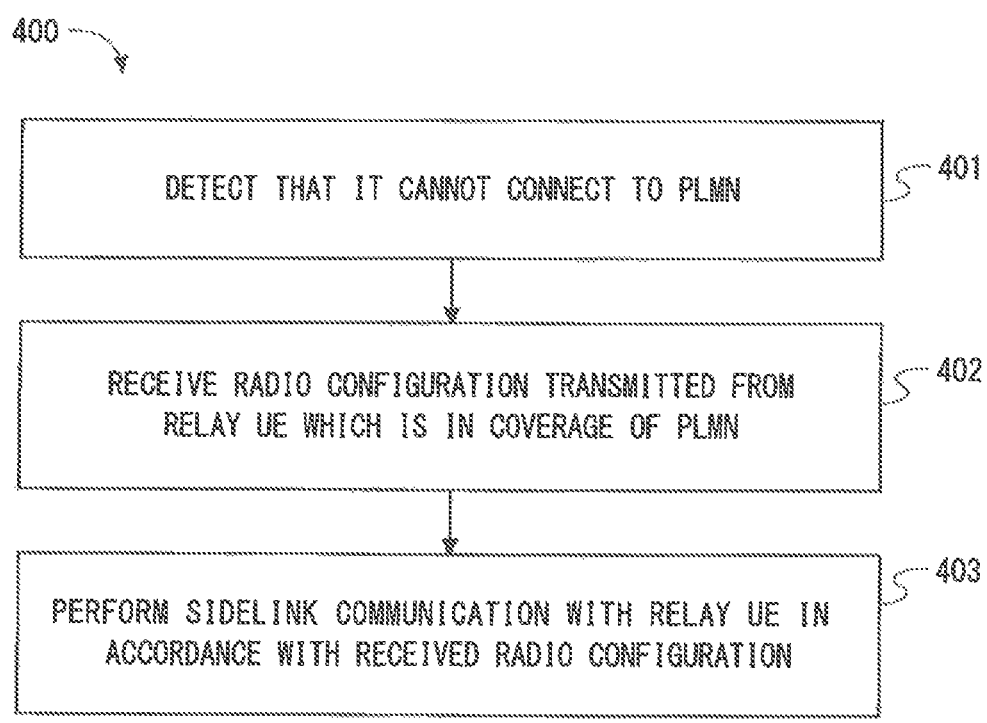
FIG. 4 is a flowchart showing one example of operations of a remote UE according to the first embodiment.

FIG. 4 is a flowchart showing one example (Process 400) of operations of the remote UE 2 regarding the sidelink communication in the partial coverage. In Block 400, the remote UE 2 detects that it cannot connect to the PLMN 100. For example, the remote UE 2 may determine that it is out of coverage of the PLMN 100 when the reception quality (e.g., RSRP or RSRQ) of the downlink signal from the eNodeB 31 is equal to or smaller than a predetermined threshold value. In Block 402, the remote UE 2 receives the aforementioned radio configuration transmitted from the relay UE 1, which is in coverage of the PLMN 100.

In Block 403, the remote UE 2 performs sidelink communication with the remote UE in accordance with the received radio configuration. In some implementations, the remote UE 2 may perform announcement (transmission) or monitoring (reception) of a discovery message (discovery signal) in accordance with the radio configuration received in Block 402. In some implementations, the relay UE 1 may transmit or receive signals for direct communication to or from the relay UE 1 (e.g., PSBCH, PSCCH, and PSSCH) in accordance with the radio configuration received in Block 402.

As described above with reference to FIGS. 3 and 4, the relay UE 1 is configured to transmit, in response to the transmission request from the PLMN 100, the radio configuration regarding the sidelink communication in the partial coverage provided from the PLMN 100. Therefore, in this embodiment, the relay UE can notify the remote UE of the radio configuration determined by the PLMN 100 for sidelink communication in the partial coverage.

Figure 5:
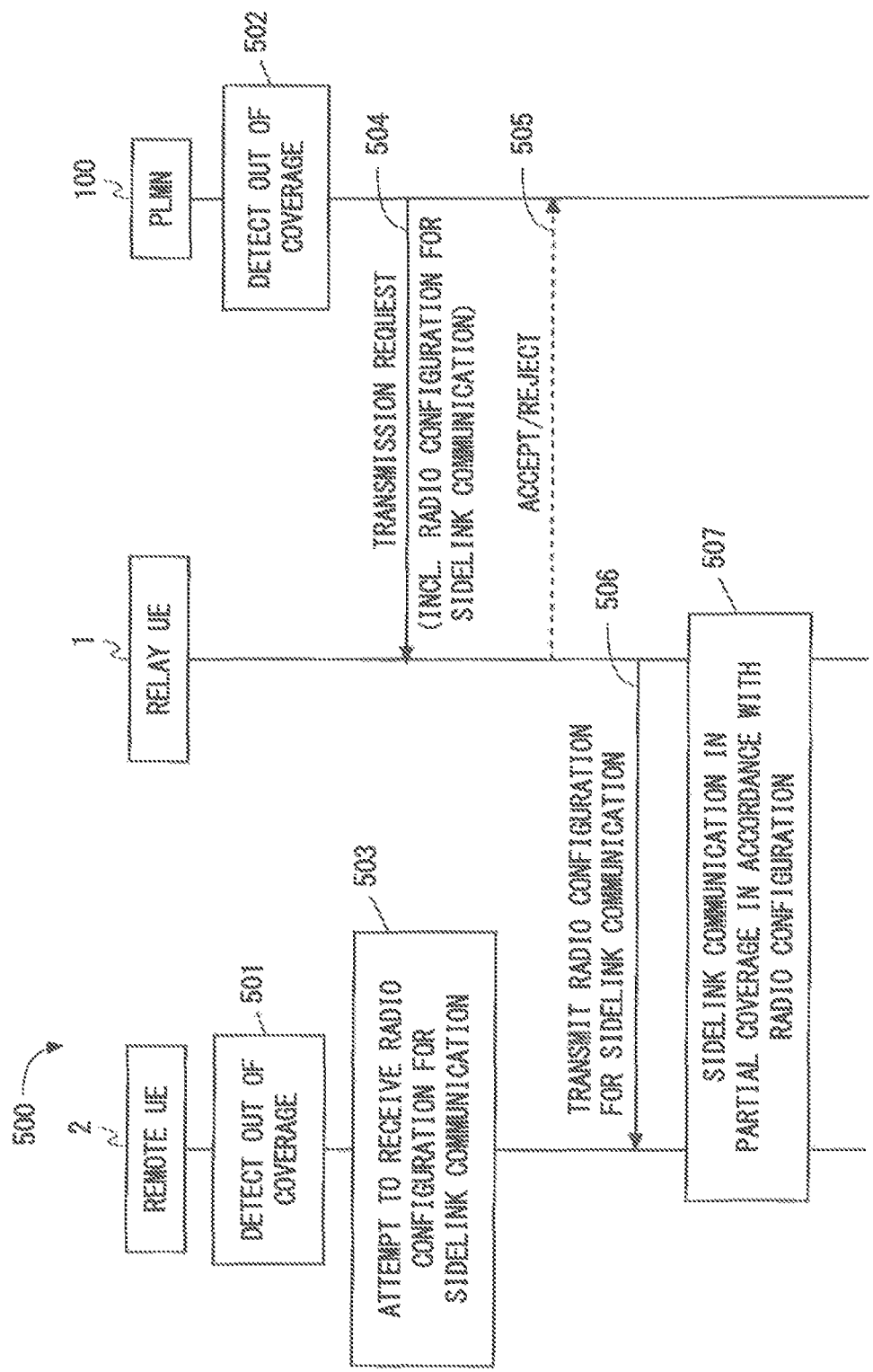
FIG. 5 is a sequence diagram showing one example of a sidelink communication procedure according to the first embodiment.

FIG. 5 is a sequence diagram showing one example (Process 500) of the sidelink communication procedure in the partial coverage according to this embodiment. In Block 501, the remote UE 2 detects that it is, or is about to be, out of coverage of the PLMN 100, As already described above, the remote UE 2 may detect that it cannot, or likely cannot, connect to the PLMN 100.

In Block 502, the control apparatus in the PLMN 100 (e.g., eNodeB 31, MME, ProSe function entity 5, or OAM server) detects that the remote UE 2 is, or is about to he, out of coverage. As already described above, the PLMN 100 may detect that network facility (e.g., the network to which the remote UE 2 is connected, the base station (eNodeB), or the cell) has gone down or is likely to go down.

In Block 503, the remote UE 2 attempts to receive the radio configuration for the sidelink communication in the partial coverage. In other words, the remote UE 2 attempts to receive the radio configuration for the sidelink communication transmitted from any one of UEs which are in coverage of the PLMN 100.

In Block 504, the control apparatus in the PLMN 100 (e.g., eNodeB 31, MME, ProSe function entity 5, or OAM server) transmits the transmission request to the relay UE 1. In the example shown in FIG. 5, this transmission request includes the radio configuration for the sidelink communication in the partial coverage. This transmission request may request the relay UE 1 to start the sidelink communication in the partial coverage in accordance with this radio configuration.

In some implementations, the PLMN 100 may select, as the relay UE 1, a UE which is located at a cell edge of the cell to which the remote UE 2 was belonged or one of neighboring cells thereof. Alternatively, when a specific base station (eNodeB) or a cell is going down, the PLMN 100 may select, as the relay UE 1, a UE which is located in one of neighboring cells (in particular, located in a cell edge of one of the neighboring cells) of the base station or the cell that is going down. Alternatively, when the network (PLMN) of one operator goes down, a UE connecting to another PLMN (in this example, the PLMN 100) may be selected as the relay UE 1.

In some implementations, the radio configuration for the sidelink communication in the partial coverage may be transmitted to the relay UE 1 prior to, or subsequent to, the transmission request by using a message different from the transmission request. For example, when the radio configuration for the sidelink communication in the partial coverage is broadcasted in the cell 32 by the eNodeB 31 using SIB 18 or SIB 19, the relay UE 1 may receive SIB 18 or SIB 19 prior to or upon receiving the transmission request.

In Block 505, in response to the transmission request transmitted in Block 504, the relay UE 1 sends to the PLMN 100 a message indicating whether the relay UE 1 can activate the sidelink communication in the partial coverage. The relay UE 1 may reject the transmission request, for example, when its battery is low of charge or its load level is high. The transmission of the response message in Block 505 may be omitted.

In Block 506, in response to the transmission request in Block 504, the relay UE 1 transmits, for the remote UE 2, the radio configuration provided from the PLMN 100.

In Block 507, the relay UE 1 performs, in accordance with the radio configuration provided from the PLMN 100, the sidelink communication (i.e., direct discovery, direct communication, or both of them) with the remote UE 2 that has received this radio configuration from the relay UE 1.

Second Embodiment

This embodiment provides a modified example of the sidelink communication procedure described in the first embodiment. The configuration example of a public land mobile network according to this embodiment is the same as that shown in FIGS. 1 and 2. In this embodiment, the relay UE 1 transmits the radio configuration for the sidelink communication in the partial coverage, which has been provided from the PLMN 100, in accordance with a "pre-configured radio parameter(s)". The remote UE 2 receives the radio configuration from the relay UE 1 in accordance with the pre-configured radio parameter(s) and, after that, starts the sidelink communication in accordance with the radio configuration provided by the PLMN 100 via the relay UE 1.

Figure 6:
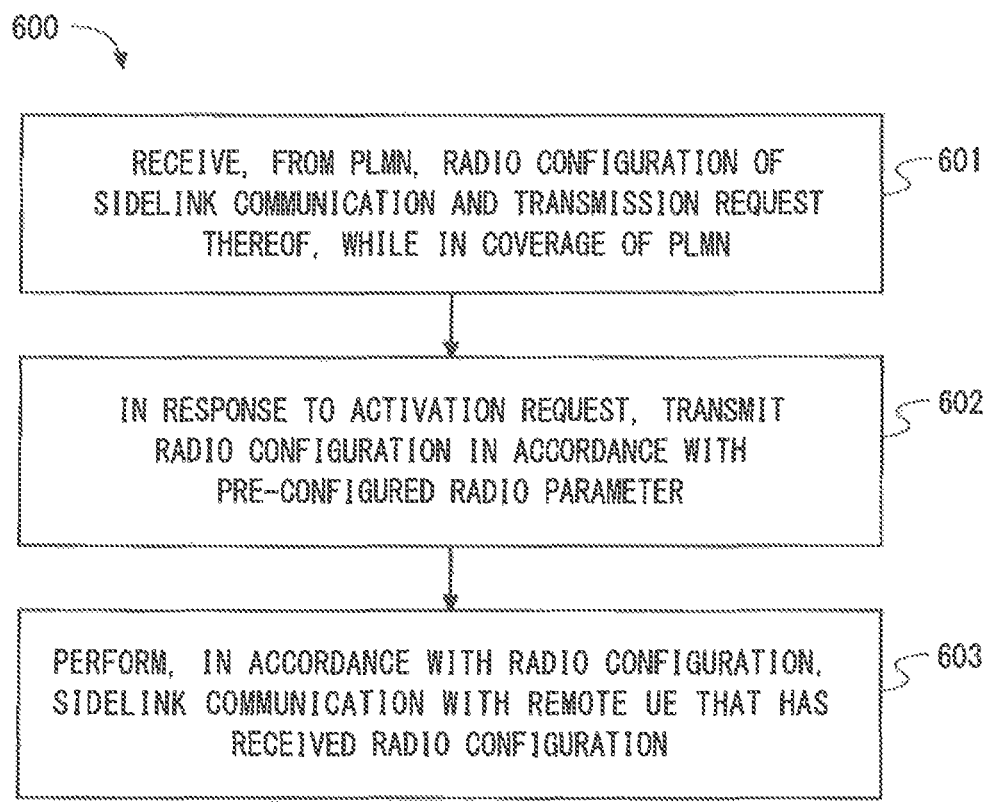
FIG. 6 is a flowchart showing one example of operations of a relay UE according to a second embodiment.

FIG. 6 is a flowchart showing one example (Process 600) of operations of the relay UE 1 regarding the sidelink communication in the partial coverage. The processes in Blocks 601-603 are basically similar to the processes in Blocks 301-303 in FIG. 3. In Block 602, however, the relay UE 1 transmits the radio configuration for the sidelink communication in the partial coverage, which has been provided from the PLMN 100, in accordance with the pre-configured radio parameter(s). The transmission request in Block 601 may request the relay UE 1 to transmit the radio configuration for the sidelink communication in the partial coverage in accordance with the pre-configured radio parameter(s) pre-configured in the relay UE 1.

Figure 7:
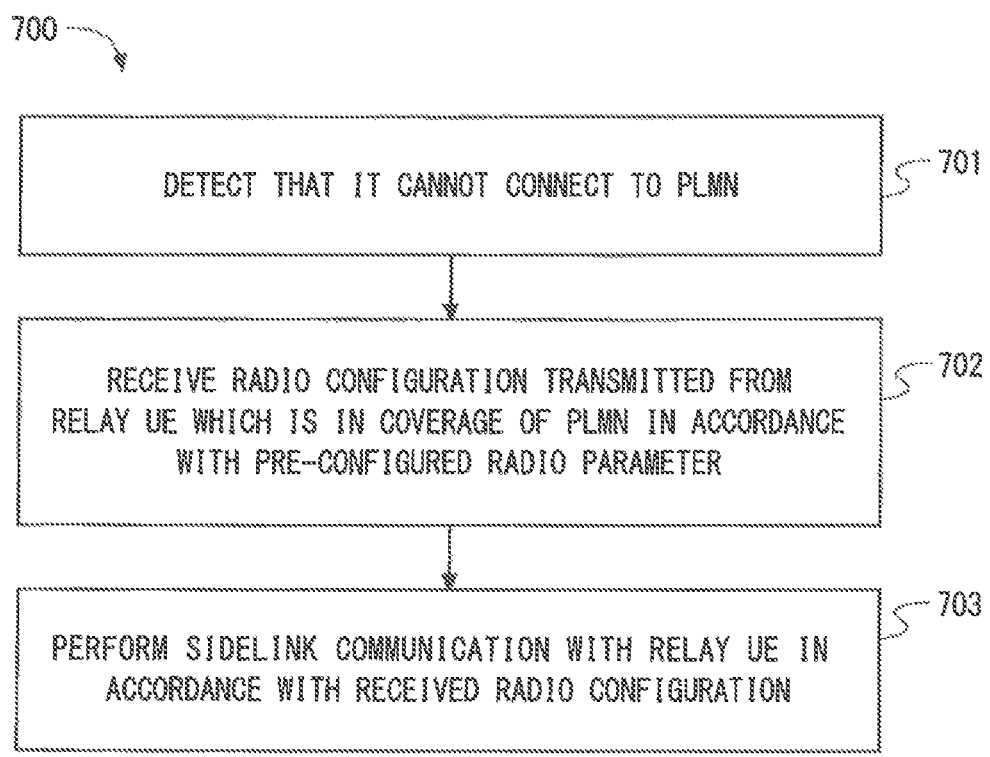
FIG. 7 is a flowchart showing one example of operations of a remote UE according to the second embodiment.

FIG. 7 is a flowchart showing one example (Process 700) of operations of the remote UE 2 regarding the sidelink communication in the partial coverage. The processes in Blocks 701-703 are basically similar to the processes in Blocks 401-403 in FIG. 4. In Block 702, however, the remote UE 2 performs the receiving operation in accordance with the pre-configured radio parameter(s) and receives the aforementioned radio configuration from the relay UE 1, which is in coverage of the PLMN 100, in accordance with the ore-configured radio parameter(s).

The pre-configured radio parameter(s) described in this embodiment specifies, for example, at least one of: a frequency band identifier, a center frequency (EARFCN); maximum transmission power (P-MAX-ProSe); Time Division Duplex (TDD) uplink-downlink configuration; the number of resource blocks (PRBs); offset of start PRE; and offset of end PRB.

The pre-configured radio parameters) is stored in a built-in memory that is installed in the relay UE 1 (or the remote UE 2) or stored in a removable memory (e.g., Universal Integrated Circuit Card (UICC)) with which the relay UE 1 (or the remote UE 2) can communicate through an interface. The built-in memory or the removable memory is a volatile memory, a non-volatile memory, or a combination thereof. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof.

The UICC is a smart card used in a cellular communication system such as a GSM system, a UMTS, and an LTE system. The UICC includes a processor and a memory and executes a Subscriber Identity Module (SIM) application or a Universal Subscriber Identity Module (USIM) application for network authentication. In a strict sense, the UICC is different from the UIM, the SIM, and the USIM. However, these terms are often used synonymously. Accordingly, while the present application mainly employs the term UICC, the term UICC as used herein may mean the UIM, the SIM, the USIM or the like.

As described with reference to FIGS. 6 and 7, the relay UE 1 is configured to transmit the radio configuration for the sidelink communication in accordance with the pre-configured radio parameter(s). Further, the remote UE 2 is configured to receive the radio configuration for the sidelink communication from the relay UE 1 in accordance with the same or corresponding pre-configured radio parameters) as the relay UE 1. Accordingly, the remote UE 2 needs to receive signals from the relay UE 1 only in accordance with the pre-configured radio parameter(s) (e.g., frequency and time) and thus does not need to perform the receiving operation in a lot of frequency resources or time resources. Therefore, the relay UE 1 and the remote UE 2 can perform the sidelink communication in the partial coverage in a stable manner.

Note that 3GPP Release 12 defines that when two UEs (e.g., the relay UE 1 and the remote UE 2) both cannot connect to the PLMN 100 (e.g., out of coverage), these UEs perform sidelink communication without assistance of the PLMN 100 (i.e., out of coverage ProSe Direct Communication) using the radio parameter(s) (e.g., Public Safety ProSe Carrier) that is pre-configured in a Mobile Equipment (ME) or in a UICC (e.g., see Non-Patent Literature 2). The "pre-configured radio parameter" for the sidelink communication in the partial coverage described in this embodiment may be common to the "pre-configured radio parameter" for the sidelink communication without the assistance of the PLMN 100. In other words, the "pre-configured radio parameter" for the sidelink communication in the partial coverage may also be used to perform the sidelink communication without the assistance of the PLMN 100 when both the relay UE 1 and the remote UE 2 cannot connect to the PLMN 100. In this way, it is possible to reduce the amount of data that is pre-configured in the relay UE 1 and the remote UE 2.

Third Embodiment

This embodiment provides a modified example of the sidelink communication procedure described in the first and second embodiments. The configuration example of a public land mobile network according to this embodiment is the same as that shown in FIGS. 1 and 2. In this embodiment, the remote UE 2 is configured to attempt to receive a first signal (e.g., a synchronization signal) transmitted by a neighboring UE, when it detects that it is about to be in a state of being unable to connect to the PLMN 100 (e.g., out of coverage). Further, the remote UE 2 is configured to, when it has successfully received the first signal, send an identifier of the first signal or an identifier indicating the UE which has transmitted the first signal to the node in the PLMN 100 (e.g., the eNodeB 31, the MME, the ProSe function entity 5, and the OAM server).

In some implementations, the relay UE 1 may transmit the synchronization signal to be detected by the remote UE 2 (e.g., Sidelink Synchronization Signal) autonomously or in response to an instruction from the PLMN 100 (e.g., the eNodeB 31) when the relay UE 1 is located in the vicinity of the edge of the cell 32 (i.e., coverage boundary of the PLMN 100). In some implementations, the relay UE 1 may autonomously transmit the synchronization signal when the reception quality (e.g., RSRP or RSRQ) of the radio signal transmitted from the eNodeB 31 is below a threshold. In some implementations, the PLMN 100 (e.g., eNodeB 31) may specify a relay UE 1 which is located in the vicinity of the cell edge and instruct this UE to transmit the synchronization signal. In some implementations, the PLMN 100 (e.g., eNodeB 31) may instruct the relay UE 1 which is located in the vicinity of the cell edge of the cell 32 to transmit the synchronization signal when the PLMN 100 (e.g., eNodeB 31) receives from the remote UE 2 a report (e.g., RRC measurement report) indicating that it is about to be out of coverage.

Figure 8:
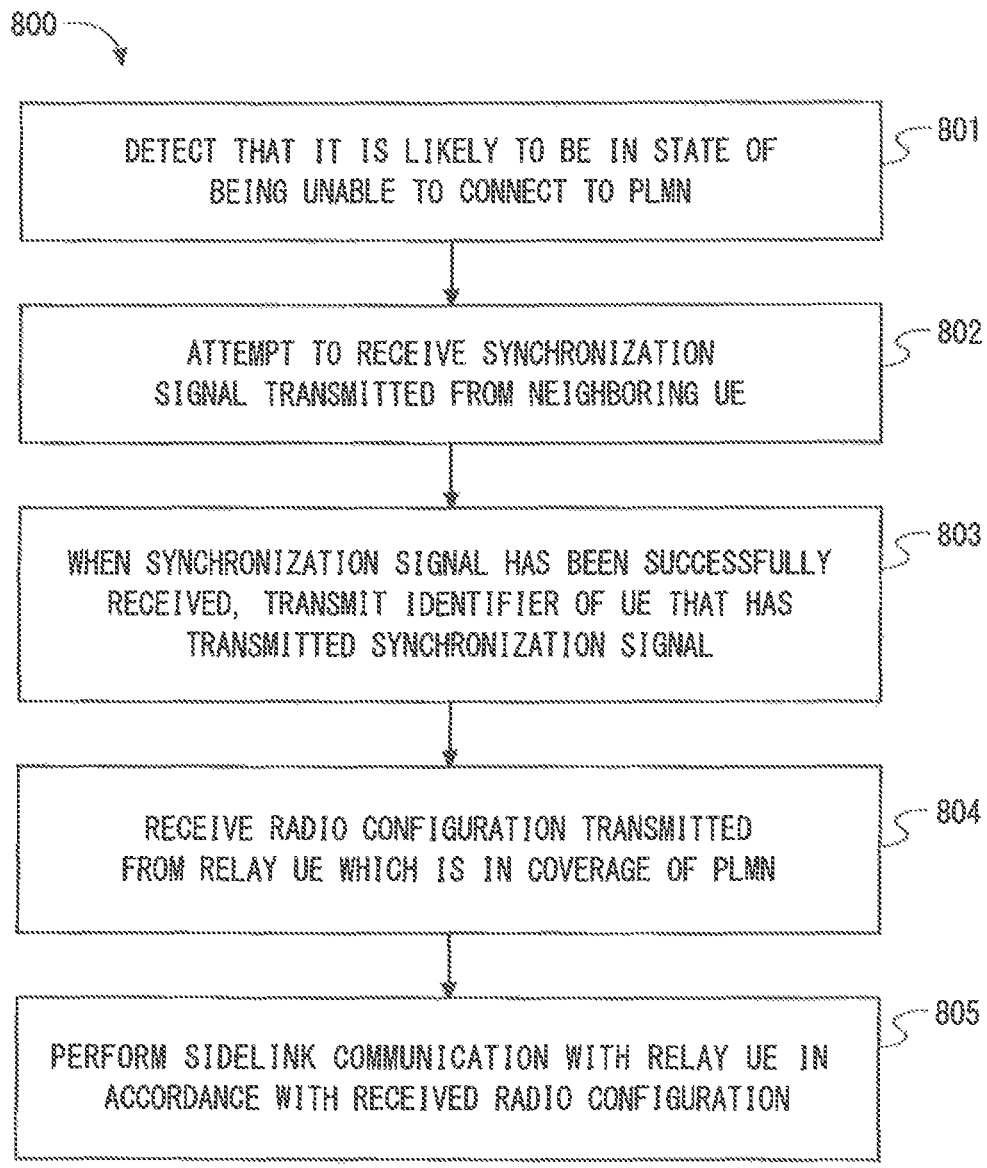
FIG. 8 is a flowchart showing one example of operations of a remote UE according to a third embodiment.

FIG. 8 is a flowchart showing one example (Process 800) of operations of the remote UE 2 regarding the sidelink communication in the partial coverage. In Block 801, the remote UE 2 detects that it is about to be in a state of being unable to connect to the PLMN 100 (e.g., out of coverage). In Block 802, the remote UE 2 attempts to receive a synchronization signal transmitted from any neighboring UEs. In some implementations, the synchronization signal may be transmitted in accordance with the pre-configured radio parameter described in the second embodiment. In Block 803, the remote UE 2 transmits the identifier of the UE that has transmitted the synchronization signal (in this example, the relay UE 1) to the network (the PLMN 100) when it has successfully received the synchronization signal. The processes in Blocks 804 and 805 are similar to the processes in Blocks 402 and 403 in FIG. 4.

Figure 9:
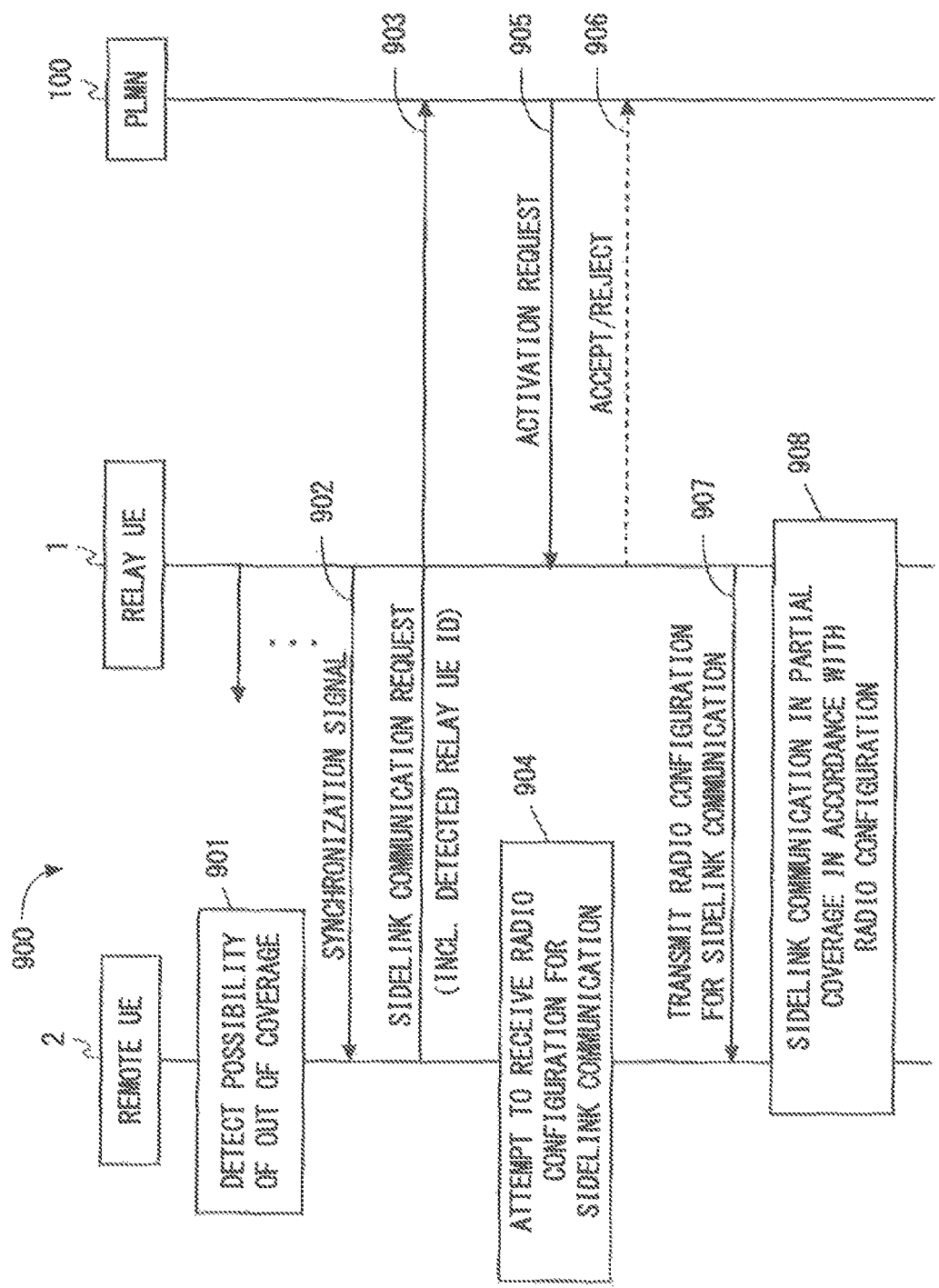
FIG. 9 is a sequence diagram showing one example of a sidelink communication procedure according to the third embodiment.

FIG. 9 is a sequence diagram showing one example (Process 900) of the sidelink communication procedure in the partial coverage according to this embodiment. In Block 901, the remote UE 2 detects that it is about to be out of coverage of the PLMN 100.

In Block 902, the remote UE 2 detects a synchronization signal transmitted from the relay UE 1. As already described above, the relay UE 1 may transmit the synchronization signal autonomously or in response to an instruction from the PLMN 100 (e.g., the eNodeB 31) when it is located in the vicinity of the cell edge of the cell 32.

In Block 903, the remote UE 2 transmits a sidelink communication request to a node in the PLMN 100 (e.g., eNodeB 31, MME, ProSe function entity 5, or OAM server). This sidelink communication request may be either a request for direct discovery or a request for direct communication. This sidelink communication request further includes the identifier of the UE (i.e., the relay UE 1) that has transmitted the synchronization signal detected in Block 902.

In response to receiving the sidelink communication request (Block 904), the node in the PLMN 100 (e.g., eNodeB 31, MME, ProSe function entity 5, or OAM server) selects a relay UE that should activate the sidelink communication in the partial coverage, and transmits the transmission request to the selected relay UE (Block 905). The node in the PLMN 100 may select the UE that has transmitted the synchronization signal and is specified in the sidelink communication request sent from the remote UE 2 (Block 904).

The processes in Blocks 904-908 are similar to the processes in Blocks 503-507 in FIG. 5.

According to the method described in this embodiment, the PLMN 100 can easily specify a relay UE 1 that should activate the sidelink communication in the partial coverage.

Figure 10:
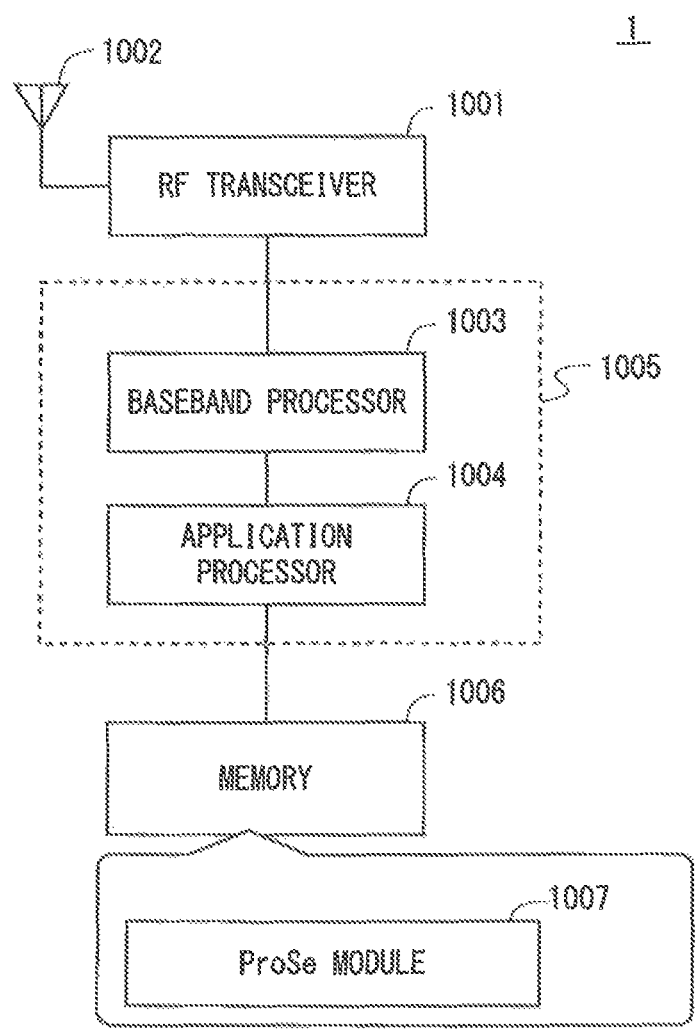
FIG. 10 is a block diagram showing a configuration example of a relay UE according to several embodiments.

Lastly, configuration examples of the relay UE 1, the remote UE 2, and the control apparatus in the network (e.g., eNodeB 31, MME, ProSe function entity 5, or OAM server) according to the aforementioned embodiments will be described. FIG. 10 is a block diagram showing a configuration example of the relay UE 1. The remote UE 2 may have a configuration similar to that shown in FIG. 10. A Radio Frequency (RF) transceiver 1001 performs analog RF signal processing to communicate with the eNodeB 31 in the PLMN 100. The RF transceiver 1001 may further be used for ProSe Direct Discovery and direct communication between the UEs 1. The RE transceiver 1001 may include a first transceiver used for communication with the eNodeB 31 in the PLMN 100 and a second transceiver used for ProSe Direct Discovery and direct communication with another UE (e.g., remote UE 2). The analog RF signal processing performed by the RE transceiver 1001 includes frequency up-conversion, frequency down-conversion, and amplification. The RF transceiver 1001 is coupled to an antenna 1002 and a baseband processor 1003. That is, the RF transceiver 1001 receives modulated symbol data (or OFDM symbol data) from the baseband processor 1003, generates a transmission RF signal, and supplies the transmission RF signal to the antenna 1002. Further, the RF transceiver 1001 generates a baseband reception signal based on a reception RF signal received by the antenna 1002, and supplies the baseband reception signal to the baseband processor 1003.

The baseband processor 1003 performs digital baseband signal processing (i.e., data plane processing) and control plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, (f) spreading/de-spreading, and (g) generation of OFDM symbol data (i.e., baseband OFDM signal) by Inverse Fast Fourier Transform (IFFT), On the other hand, the control plane processing includes communication management of layer 1 (e.g., transmission power control), layer 2 (e.g., radio resource management and hybrid automatic repeat request (HARQ) processing), and layer 3 (e.g., signalling regarding attach, mobility, and call management).

The baseband processor 1003 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control plane processing. In this case, the protocol stack processor, which performs control plane processing, may be integrated with an application processor 1004 described in the following.

The application processor 1004 is also referred to as a CPU, an MPU, a microprocessor, or a processor core. The application processor 1004 may include a plurality of processors (processor cores). The application processor 1004 loads a system software program (Operating System (OS)) and various application programs (e.g., a voice call application, a WEB browser, a mailer, a camera operation application, and a music player application) from a memory 1006 or from another memory (not shown) and executes these programs, thereby providing various functions of the UE1.

In some implementations, as represented by a dashed line (1005) in FIG. 10, the baseband processor 1003 and the application processor 1004 may be integrated on a single chip. In other words, the baseband processor 1003 and the application processor 1004 may be implemented in a single System on Chip (SoC) device 1005. A SoC device may be referred to as a system Large Scale Integration (LSI) or a chipset.

The memory 1006 is a volatile memory, a non-volatile memory, or a combination thereof. The memory 1006 may include a plurality of memory devices that are physically independent from each other. The volatile memory is, for example, an SRAM, a DRAM, or a combination thereof. The non-volatile memory is, for example, an MROM, a PROM, a flash memory, a hard disc drive, or any combination thereof. The memory 1006 may include, for example, an external memory device that can be accessed from the baseband processor 1003, the application processor 1004, and the SoC 1005. The memory 1006 may include an internal memory device that is Integrated in the baseband processor 1003, the application processor 1004, or the SoC 1005. Further, the memory 1006 may include a memory in a UICC.

The memory 1006 stores a ProSe module 1007. As already described above, the memory 1006 may include a plurality of memory devices that are physically independent from each other, and these software and data may be stored in the same memory device or may be stored in different memory devices.

The ProSe module 1007 includes a software module to be executed by the baseband processor 1003 or the application processor 1004. Accordingly, the baseband processor 1003 or the application processor 1004 communicates with the ProSe function entity 5, the MME, and the eNodeB 31 to perform ProSe communication (e.g., EPC-level ProSe Discovery, ProSe Direct Discovery, ProSe Direct Communication) assisted by the PLMN 100 within the coverage of the PLMN 100 and to also perform registration procedures required for this ProSe communication.

The ProSe module 1007 further includes instructions and data to perform the processing of the relay UE 1 regarding the sidelink communication in the partial coverage described in the aforementioned embodiments. Thus, the baseband processor 1003 or the application processor 1004 loads software modules including the ProSe module 1007 from the memory 1006 and executes these loaded software modules, thereby performing the processing of the relay UE 1 described in the aforementioned embodiments.

Figure 11:
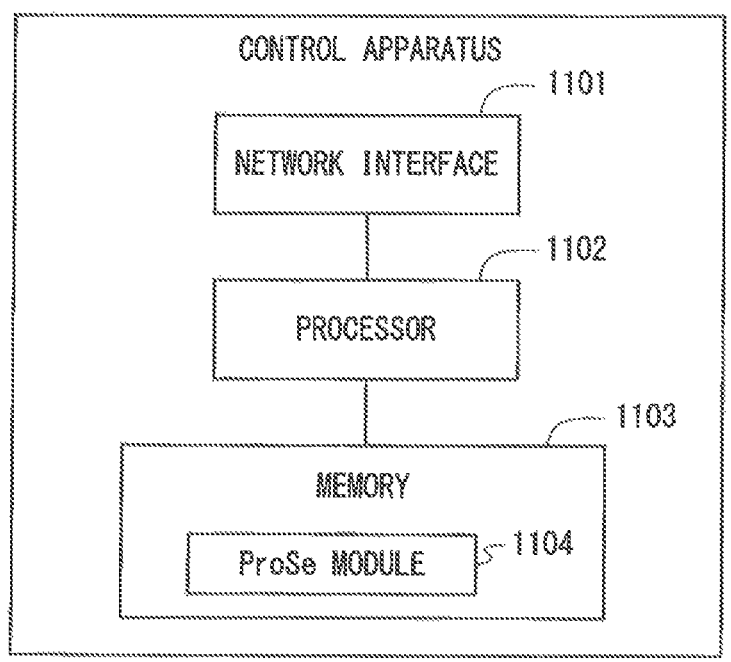
FIG. 11 is a block diagram showing a configuration example of a control apparatus (e.g., ProSe function entity) according to several embodiments.

FIG. 11 shows a configuration example of the control apparatus in the network (e.g., eNodeB 31, MME, ProSe function entity 5, or OAM server). Referring to FIG. 11, this control apparatus includes a network interface 1101, a processor 1102, and a memory 1103, The network interface 1101 is used to communicate with the relay UE 1. The network interface 1101 may include, for example, a network interface card (NIC) conforming to the IEEE 802.3 series.

The processor 1102 loads software (computer program) from the memory 1103 and executes the loaded software, thereby performing the processing of the control apparatus in the PLMN 100 described with reference to the sequence diagrams and flowchart in the aforementioned embodiments (e.g., transmission of the request for transmission of the radio configuration of the sidelink communication in the partial coverage). The processor 1102 may be, for example, a microprocessor, an MPU, or a CPU. The processor 1102 may include a plurality of processors.

The memory 1103 is composed of a combination of a volatile memory and a non-volatile memory. The memory 1103 may include a storage that is located apart from the processor 1102. In this case, the processor 1102 may access the memory 1103 via an I/O interface (not shown).

In the example shown in FIG. 11, the memory 1103 is used to store software modules including a ProSe module 1104. The ProSe module 1104 includes instructions and data for performing the processing of the control apparatus described in the aforementioned embodiments (e.g., transmission of the request for transmission of the radio configuration of the sidelink communication in the partial coverage). The processor 1102 loads software modules including the ProSe module 1104 from the memory 1103 and executes these loaded software modules, thereby performing the processing of the control apparatus described in the aforementioned embodiments.

As described above with reference to FIGS. 10 and 11, each of the processors included in the relay UE 1, the remote UE 2, and the control apparatus in the PLMN 100 according to the aforementioned embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical, magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

Each of the above-described embodiments may be used individually, or two or more of the embodiments may be appropriately combined with one another.

In the aforementioned embodiments, the relay UE 1 may notify the eNodeB 31 of the radio resources (e.g., frequency resources), which is used for the sidelink communication in the partial coverage and is determined in accordance with the radio configuration provided from the eNodeB 31. Accordingly, the eNodeB 31 can consider the radio resources to be used for the sidelink communication in the partial coverage at the time of scheduling of the uplink communication (101) with the relay UE 1 or uplink communication with another UE (radio resource allocation); The relay UE 1 may notify another node (e.g., the ProSe function entity 5 or the OAM server) of the radio resources (e.g., frequency resources) to be used for the sidelink communication in the partial coverage.

In the aforementioned embodiments, the example in which the specification of the radio configuration for the sidelink communication and the notification sent to the relay UE 1 are performed by the eNodeB 31 has been described. However, the specification of the radio configuration and the notification sent to the relay UE 1 may be performed by another node (e.g., the ProSe function entity 5 or the OAM server).

The above-described embodiments are described by using specific examples mainly related to the EPS. However, these embodiments may be applied to other mobile communication systems such as a Universal Mobile Telecommunications System (UMTS), a 3GPP2 CDMA2000 system (1×RTT, High Rate Packet Data (HRPD)), a Global System for Mobile communications (GSM)/General packet radio service (GPRS) system, and a mobile WiMAX system. In this case, the processes or the procedures regarding sidelink communication performed by the eNodeB 31 described in the above-described embodiments may be performed by a radio access network node having a radio resource management function (e.g., Radio Network Controller (RNC) in a UMTS or Base Station Controller (BSC) in a GSM system).

Further, the embodiments stated above are merely examples of applications of the technical ideas obtained by the present inventors. Needless to say, these technical ideas are not limited to the above-described embodiments and various modifications can be made thereto.

For example, the whole or part of the embodiments disclosed above can be described as, but not limited to, the following supplementary notes.

(Supplementary Note 1)
A radio terminal apparatus comprising:
at least one radio transceiver; and
at least one processor coupled to the at least one radio transceiver, wherein
the at least one processor is configured to receive a request and a radio configuration from the network via the at least one radio transceiver when the radio terminal apparatus can connect to the network, the request requesting transmission of the radio configuration, the radio configuration comprising a radio parameter for sidelink communication with a second radio terminal which is in a state of being unable to connect to the network, the sidelink communication comprising at least one of direct discovery and direct communication,
the at least one processor is configured to transmit the radio configuration via the at least one radio transceiver, and
the at least one processor is configured to perform the sidelink communication in accordance with the radio configuration, via the at least one radio transceiver, with the second radio terminal that has received the radio configuration.

(Supplementary Note 2)
The radio terminal apparatus according to Supplementary Note 1, wherein the at least one processor is configured to send to the network a message indicating whether the radio terminal apparatus can activate the sidelink communication.

(Supplementary Note 3)
The radio terminal apparatus according to Supplementary Note 1 or 2, wherein the at least one processor is configured to transmit the radio configuration in accordance with a pre-configured first radio parameter.

(Supplementary Note 4)
The radio terminal apparatus according to Supplementary Note 3, wherein the first radio parameter is also used to perform the sidelink communication without assistance of the network when both the radio terminal apparatus and the second radio terminal cannot connect to the network.

(Supplementary Note 5)
The radio terminal apparatus according to Supplementary Note 3 or 4, wherein the first radio parameter is pre-configured in the radio terminal apparatus or in a Universal Integrated Circuit Card (UICC) coupled to the radio terminal apparatus.

(Supplementary Note 6)
The radio terminal apparatus according to any one of Claims 1 to 5, wherein the at least one processor is configured to transmit the radio configuration when transmitting a synchronization signal.

(Supplementary Note 7)
The radio terminal apparatus according to Supplementary Note 6, wherein the at least one processor is configured to transmit the synchronization signal autonomously or in response to an instruction from the network when the radio terminal apparatus is located in a vicinity of a coverage boundary of the network.

(Supplementary Note 8)
The radio terminal apparatus according to Supplementary Note 6, wherein the at least one processor is configured to autonomously transmit the synchronization signal when a reception quality of a radio signal transmitted from the network is below a threshold.

(Supplementary Note 9)
The radio terminal apparatus according to any one of Supplementary Notes 1 to 8, wherein the at least one processor is configured to notify the network of a radio resource to be used for the sidelink communication determined in accordance with the radio configuration.

(Supplementary Note 10)
The radio terminal apparatus according to any one of Supplementary Notes 1 to 9, wherein the request is configured to request sidelink communication with a second radio terminal which is in a state of being unable to connect to the network.

(Supplementary Note 11)
The radio terminal apparatus according to any one of Supplementary Notes 1 to 10, wherein the request is transmitted to the radio terminal apparatus from one of a base station in the network, a mobility management node in the network, an Operation Administration and Maintenance (OAM) server, and a control entity that controls network-assisted proximity-based service communication.

(Supplementary Note 12)
A radio terminal apparatus comprising:
at least one radio transceiver; and
at least one processor coupled to the at least one radio transceiver, wherein
the at least one processor is configured to, when the radio terminal apparatus cannot connect to a network, receive a radio configuration transmitted from a first radio terminal which is in a state of being able to connect to the network, the radio configuration comprising a radio parameter for the radio terminal apparatus which is in a state of being unable to connect to the network to perform sidelink communication with the first radio terminal which is in the state of being able to connect to the network, the sidelink communication comprising at least one of direct discovery and direct communication, and
the at least one processor is configured to perform the sidelink communication in accordance with the radio configuration with the first radio terminal via the at least one radio transceiver, (Supplementary Note 13)
The radio terminal apparatus according to Supplementary Note 12, wherein
the at least one processor is configured to, when detecting that the radio terminal apparatus is about to be in the state of being unable to connect to the network, attempt to receive a first signal transmitted by a neighboring radio terminal, and
the at least one processor is configured to, when the first signal has been successfully received, send to the network an identifier of the first signal or an identifier indicating a radio terminal which has transmitted the first signal.

(Supplementary Note 14)
The radio terminal apparatus according to Supplementary Note 12 or 13, wherein the at least one processor is configured to receive the radio configuration in accordance with a pre-configured first radio parameter.

(Supplementary Note 15)
The radio terminal apparatus according to Supplementary Note 13, wherein the at least one processor is configured to receive the first signal in accordance with a pre-configured first radio parameter.

(Supplementary Note 16)
The radio terminal apparatus according to Supplementary Note 14 or 15, wherein the first radio parameter is also used to perform the sidelink communication without assistance of the network when both the radio terminal apparatus and the first radio terminal cannot connect to the network, (Supplementary Note 17)
The radio terminal apparatus according to any one of Supplementary Notes 14 to 16, wherein the first radio parameter is pre-configured in the radio terminal apparatus or in a Universal Integrated Circuit Card (UICC) coupled to the radio terminal apparatus.

(Supplementary Note 18)
The radio terminal apparatus according to any one of Supplementary Notes 12 to 17, wherein the at least one processor is configured to receive the radio configuration when a synchronization signal transmitted from the first radio terminal has been successfully received.

(Supplementary Note 19)
The radio terminal apparatus according to Supplementary Note 18, wherein the synchronization signal is transmitted autonomously or in response to an Instruction from the network when the first radio terminal is located in a vicinity of a coverage boundary of the network.

(Supplementary Note 20)
A network apparatus located in a network, the network apparatus comprising:
a memory; and
at least one processor coupled to the memory, wherein
the at least one processor is configured to transmit a request and a radio configuration to a first radio terminal which is in a state of being able to connect to the network,
the request is configured to request the first radio terminal to transmit the radio configuration,
the radio configuration comprises a radio parameter for sidelink communication with a second radio terminal which is in a state of being unable to connect to the network, and
the sidelink communication comprises at least one of direct discovery and direct communication.

(Supplementary Note 21)
The network apparatus according to Supplementary Note 20, wherein the at least one processor is configured to receive from the first radio terminal a response message indicating whether the first radio terminal can activate the sidelink communication, (Supplementary Note 22)
The network apparatus according to Supplementary Note 20 or 21, wherein the request is configured to request the first radio terminal to transmit the radio configuration in accordance with a first radio parameter pre-configured in the first radio terminal, (Supplementary Note 23)
The network apparatus according to Supplementary Note 22, wherein the first radio parameter is also used to perform the sidelink communication without assistance of the network when both the radio terminal apparatus and the second radio terminal cannot connect to the network, (Supplementary Note 24)
The network apparatus according to Supplementary Note 22 or 23, wherein the first radio parameter is pre-configured in the radio terminal apparatus or in a Universal Integrated Circuit Card (UICC) coupled to the radio terminal apparatus.

(Supplementary Note 25)
A method performed by a first radio terminal, the method comprising:
receiving a request and a radio configuration from the network when the first radio terminal can connect to the network, the request requesting transmission of the radio configuration, the radio configuration comprising a radio parameter for sidelink communication with a second radio terminal which is in a state of being unable to connect to the network, the sidelink communication comprising at least one of direct discovery and direct communication; and
transmitting the radio configuration.

(Supplementary Note 26)
The method according to Supplementary Note 25, further comprising sending to the network a message indicating whether the first radio terminal can activate the sidelink communication.

(Supplementary Note 27)
The method according to Supplementary Note 25 or 26, wherein the transmitting comprises transmitting the radio configuration in accordance with a pre-configured first radio parameter.

(Supplementary Note 28)
The method according to Supplementary Note 27, wherein the first radio parameter is also used to perform the sidelink communication without assistance of the network when both the first radio terminal and the second radio terminal cannot connect to the network.

(Supplementary Note 29)
The method according to Supplementary Note 27 or 28, wherein the first radio parameter is pre-configured in the first radio terminal or In a Universal Integrated Circuit Card (UICC) coupled to the first radio terminal.

(Supplementary Note 30)
The method according to any one of Supplementary Notes 25 to 29, wherein the transmitting comprises transmitting the radio configuration when transmitting a synchronization signal.

(Supplementary Note 31)
The method according to Supplementary Note 30, further comprising transmitting the synchronization signal autonomously or in response to an instruction from the network when the first radio terminal is located in a vicinity of a coverage boundary of the network.

(Supplementary Note 32)
The method according to any one of Supplementary Notes 25 to 31, further comprising performing the sidelink communication, in accordance with the radio configuration, with the second radio terminal that has received the radio configuration.

(Supplementary Note 33)

The method according to Supplementary Note 32, further comprising notifying the network of a radio resource to be used for the sidelink communication determined in accordance with the radio configuration.

(Supplementary Note 34)

A method performed by a second radio terminal, the method comprising:

receiving, when the second radio terminal cannot connect to a network, a radio configuration transmitted from a first radio terminal which is in a state of being able to connect to the network, the radio configuration comprising a radio parameter for the second radio terminal which is in a state of being unable to connect to the network to perform sidelink communication with the first radio terminal which is in the state of being able to connect to the network, the sidelink communication comprising at least one of direct discovery and direct communication; and performing the sidelink communication in accordance with the radio configuration with the first radio terminal.

(Supplementary Note 35)

The method according to Supplementary Note 34, further comprising:

when detecting that the second radio terminal is about to be in the state of being unable to connect to the network, attempting to receive a first signal transmitted by a neighboring radio terminal; and when the first signal has been successfully received, sending to the network an identifier of the first signal or an identifier indicating a radio terminal which has transmitted the first signal, (Supplementary Note 36)

The method according to Supplementary Note 34 or 35, wherein the receiving comprises receiving the radio configuration in accordance with a pre-configured first radio parameter.

(Supplementary Note 37)

The method according to Supplementary Note 35, wherein the attempting comprises attempting to receive the first signal in accordance with a pre-configured first radio parameter.

(Supplementary Note 38)

The method according to Supplementary Note 36 or 37, wherein the first radio parameter is also used, to perform the sidelink communication without assistance of the network when both the first radio terminal and the second radio terminal cannot connect to the network.

(Supplementary Note 39)

The method according to any one of Supplementary Notes 36 to 38, wherein the first radio parameter is pre-configured in the second radio terminal or in a Universal Integrated Circuit Card (UICC) coupled to the second radio terminal.

(Supplementary Note 40)

The method, according to any one of Supplementary Notes 34 to 39, wherein the receiving comprises receiving the radio configuration when a synchronization signal transmitted from the first radio terminal has been successfully received.

(Supplementary Note 41)

The method according to Supplementary Note 40, wherein, the synchronization signal is transmitted autonomously or in response to an instruction from the network when the first radio terminal is located in a vicinity of a coverage boundary of the network.

(Supplementary Note 42)

A method performed by a network apparatus located in a network, the method comprising:

transmitting a request and a radio configuration to a first radio terminal which is in a state of being able to connect to the network, the request requesting the first radio terminal to transmit the radio configuration, the radio configuration comprising a radio parameter for sidelink communication with a second radio terminal which is in a state of being unable to connect to the network, the sidelink communication comprising at least one of direct discovery and direct communication.

(Supplementary Note 43)

A program for causing a computer to perform a method in a first radio terminal, wherein the method comprises:

receiving a request and a radio configuration from the network when the first radio terminal can connect to the network, the request requesting transmission of the radio configuration, the radio configuration comprising a radio parameter for sidelink communication with a second radio terminal which is in a state of being unable to connect to the network, the sidelink communication comprising at least one of direct discovery and direct communication;

transmitting the radio configuration; and performing the sidelink communication, in accordance with the radio configuration, with the second radio terminal that has received the radio configuration.

(Supplementary Note 44)

A program for causing a computer to perform a method in a second radio terminal, wherein the method comprises:

receiving, when the second radio terminal cannot connect to a network, a radio configuration transmitted from a first radio terminal which is In a state of being able to connect to the network, the radio configuration comprising a radio parameter for the second radio terminal which is in a state of being unable to connect to the network to perform sidelink communication with the first radio terminal which is in the state of being able to connect to the network, the sidelink communication comprising at least one of direct discovery and direct communication; and performing the sidelink communication in accordance with the radio configuration with the first radio terminal.

(Supplementary Note 45)

A program for causing a computer to perform a method in a network apparatus located in a network, wherein the method comprises transmitting a request and a radio configuration to a first radio terminal which is in a state of being able to connect to the network, the request is configured to request the first radio terminal to transmit the radio configuration, the radio configuration comprises a radio parameter for sidelink communication with a second radio terminal which is in a state of being unable to connect to the network, and the sidelink communication comprises at least one of direct discovery and direct communication.

This application is based upon and claims the benefit of priority from Japanese Patent Application No. 2015-045185, filed on Mar. 6, 2015, the disclosure of which is incorporated herein in its entirety by reference.

REFERENCE SIGNS LIST

1 Relay User Equipment (UE)
2 Remote UE
3 Evolved Universal Terrestrial Radio Access Network (E-UTRAN)
4 Evolved Packet Core (EEC)

5 Proximity-Based Services (ProSe) Function Entity
6 Prose Application Server
31 Evolved NodeB (eNodeB)
32 Cell
100 Public Land Mobile Network (PLMN)
102 Inter-UE Direct Interface (Sidelink)

The invention claimed is:

1. A radio terminal apparatus comprising:
   at least one radio transceiver; and
   at least one processor coupled to the at least one radio transceiver and configured to:
   receive, when the radio terminal apparatus cannot connect to a network, a radio configuration transmitted from a first radio terminal which is in a state of being able to connect to the network, the radio configuration comprising a radio parameter for the radio terminal apparatus to perform sidelink communication with the first radio terminal, the sidelink communication comprising at least one of direct discovery and direct communication;
   perform the sidelink communication in accordance with the radio configuration, with the first radio terminal via the at least one radio transceiver;
   attempt to receive, when detecting that the radio terminal apparatus is about to be in the state of being unable to connect to the network, a first signal transmitted by a neighboring radio terminal; and
   send, to the network, when the first signal has been successfully received, an identifier of the first signal or an identifier indicating a radio terminal which has transmitted the first signal.

2. The radio terminal apparatus according to claim 1, wherein the at least one processor is configured to receive the radio configuration when a synchronization signal transmitted from the first radio terminal has been successfully received.

3. The radio terminal apparatus according to claim 1, wherein the at least one processor is configured to receive the radio configuration in accordance with a pre-configured first radio parameter.

4. The radio terminal apparatus according to claim 1, wherein the at least one processor is configured to receive the first signal in accordance with a pre-configured first radio parameter.

5. The radio terminal apparatus according to claim 3, wherein the first radio parameter is also used to perform the sidelink communication without assistance of the network when both the radio terminal apparatus and the first radio terminal cannot connect to the network.

6. A method performed by a second radio terminal, the method comprising:
   receiving, when the second radio terminal cannot connect to a network, a radio configuration transmitted from a first radio terminal which is in a state of being able to connect to the network, the radio configuration comprising a radio parameter for the second radio terminal to perform sidelink communication with the first radio terminal, the sidelink communication comprising at least one of direct discovery and direct communication;
   performing the sidelink communication in accordance with the radio configuration, with the first radio terminal;
   attempting to receive, when detecting that the second radio terminal is about to be in a state of being unable to connect to the network, a first signal transmitted by a neighboring radio terminal; and
   sending, to the network, when the first signal has been successfully received, an identifier of the first signal or an identifier indicating a radio terminal which has transmitted the first signal.

* * * * *